United States Patent [19]

McIntyre et al.

[11] Patent Number: 4,578,162

[45] Date of Patent: Mar. 25, 1986

[54] METHOD FOR DISSOLVING COPPER IN THE PRESENCE OF IRON

[75] Inventors: James A. McIntyre; Robert F. Phillips; Max R. Oswald, all of Midland, Mich.

[73] Assignee: The Dow Chemical Company, Midland, Mich.

[21] Appl. No.: 614,502

[22] Filed: May 29, 1984

[51] Int. Cl.⁴ .............................................. C25C 1/12
[52] U.S. Cl. .................................... 204/107; 204/106; 204/400; 122/379; 134/2; 134/3; 134/26; 134/28; 427/430.1; 75/101 R; 75/101 BE; 75/103; 75/104; 75/117
[58] Field of Search .......................... 148/23; 156/634; 75/97 R, 97 A, 101 R, 104, 103, 101 BE, 117; 204/106, 107, 195 R; 427/430 A; 122/379; 134/2–3, 26, 28

[56] References Cited

U.S. PATENT DOCUMENTS

| | | | |
|---|---|---|---|
| 3,413,160 | 11/1968 | Teumac | 134/2 |
| 3,447,965 | 6/1969 | Teumac | 134/2 |
| 3,785,944 | 1/1974 | Atwood et al. | 204/107 |
| 4,337,128 | 6/1982 | Haahonsen et al. | 204/107 |
| 4,443,268 | 4/1984 | Cook | 134/2 |

*Primary Examiner*—R. L. Andrews
*Attorney, Agent, or Firm*—James H. Dickerson, Jr.

[57] ABSTRACT

The invention is a method for dissolving copper in the presence of iron comprising:
(a) contacting the copper with an oxidant solution;
(b) dissolving at least a portion of the copper into the solution;
(c) controlling the copper ion concentration in the solution below that required to cause a runaway oxidant decomposition reaction;
(d) removing at least a portion of the dissolved copper from the solution;
(e) adding additional oxidant to the solution; and
(f) at least repeating steps (a) and (b).

14 Claims, No Drawings

METHOD FOR DISSOLVING COPPER IN THE PRESENCE OF IRON

Steam generators, especially high pressure steam generators, used, for example, in nuclear-generated power facilities, are periodically cleaned to remove metallic encrustations that form during normal operation of the generators. The encrustations are primarily composed of iron and copper, or oxides of iron and copper, picked up by the water from the heat exchangers and the piping of the steam generation system. Such encrustations decrease the efficiency of the system and, if not removed, can cause plugging problems. Methods are available for individually removing either iron or copper, but these methods do not always work well when mixtures of iron and copper or their compounds are present. For example, when an iron solvent is used in the presence of copper, a portion of the copper dissolves but frequently precipitates in large flakes of copper. These flakes can cause plugging problems in the steam generator circulation system.

On the other hand, copper solvents do not work well in the presence of iron. Copper solvents normally contain an oxidant (to ionize the copper and make it soluble) and a complexing agent (to keep the dissolved copper in solution). Unfortunately copper ions catalytically decompose the oxidant in an exothermic reaction. Thus, it is desirable to dissolve the copper as quickly as possible to minimize the amount of oxidant catalytically decomposed. However, iron-containing compounds slow the diffusion-controlled copper dissolution reaction and gives the copper ions time to catalytically decomposed the oxidant. As a result, there may be insufficient oxidant available to effect complete dissolution of the copper. In addition, substantial amounts of the oxidant may be wasted.

The addition of more oxidant, after a reasonably high level of copper ions are present in solution, is not practical because the exothermic decomposition reaction will take place even more rapidly under the elevated temperature conditions. Likewise, the addition of too much oxidant under these conditions could lead to a runaway decomposition reaction which could damage the equipment or create a safety hazard to persons in the area. The use of a fresh oxidant solution is not practical because it increases the volume of heavy metal containing waste that must be disposed of at the end of the cleaning operation.

The present invention provides a method for using an oxidant solution to dissolve copper in the presence of iron or iron compounds while minimizing the amount of oxidant decomposed during the copper dissolution and minimizing the volume of oxidant solution needed.

SUMMARY OF THE INVENTION

The invention is a method for dissolving copper in the presence of iron comprising:
(a) contacting the copper with an oxidant solution;
(b) dissolving at least a portion of the copper into the solution;
(c) controlling the copper ion concentration in the solution below that level causing a runaway oxidant decomposition reaction;
(d) removing at least a portion of the dissolved copper from the solution;
(e) adding additional oxidant to the solution; and
(f) at least repeating steps (a) and (b).

DETAILED DESCRIPTION

As referred to herein "copper" and "iron" include pure copper and iron as well as copper or iron compounds such as oxides, halides, carbonates, and sulfates.

The present invention is a cleaning method involving the incremental addition of an oxidant and the periodic removal of copper ions from the oxidant solution. The present method solves several heretofore unsolved problems with dissolving copper from copper-iron deposits. The present invention minimizes: the amount of oxidant needed to dissolve a specific amount of copper, the possibility of a runaway reaction occurring, the likelihood of damage to the equipment being cleaned, the volume of spent solution which must be disposed of, and the temperature rise of the oxidant solution during cleaning (which minimizes the amount of oxidant thermally decomposed).

The present method is applicable to all processes in which copper is dissolved in the presence of iron, for example, in steam boiler cleaning processes and in etching processes.

Oxidants suitable for use in the present invention include, for example, aqueous solutions of alkaline metal persulfates, ferric chloride, ferric citrate, the ferric chelate of ethylenediaminetetraacetic acid and its salts, water soluble ferric salts, ammonium persulfate and ammonium bromate. Water, in which an oxygen containing gas, such as air or oxygen, has been dissolved is also a suitable oxidant. A variety of oxidant solutions are known in the art and are taught in U.S. Pat. Nos. 3,413,160; 1,484,690; 3,896,043; 3,438,811; 2,567,835 and 3,761,369.

The oxidant solution may optionally contain a complexing agent or a chelating agent to minimize the precipitation of copper from the solution prior to its intentional removal. Such agents are commonly present in concentrations from about 0.5 to about 50 weight percent. Suitable agents include, for example, alkali metal salts of ethylenediaminetetraacetic acid (EDTA), diethylenetriaminepentaacetic acid (DTPA), N-hydroxyethyl-ethylenediaminetriacetic acid (HEDTA) and ammonia, ammonium ions, triethanolamine, and citric acid.

In addition, the oxidant solution may optionally contain surfactants to aid in the dissolution of the copper. Optionally, the oxidant solution may also contain pH control agents or buffers including, for example, sodium hydroxide, potassium hydroxide and ammonium hydroxide to enhance dissolution. Ammonium hydroxide is the most commonly used alkaline pH control agent.

In formulating the oxidant solution, there are two main considerations:
(1) the stoichiometric amount of oxidant needed, and
(2) the concentration of the oxidant in the oxidant solution.

Since the oxidant is incrementally added to the solution, the stoichiometric amount of oxidant needed to remove the copper is not of great concern since oxidant is merely incrementally added until substantially all the copper has been removed. Preferably, however, oxidant is present at a less than stoichiometric amount to minimize the possibility of a runaway reaction.

The more important factor is the concentration of the oxidant in the solution. If the oxidant concentration is too low, an excessive amount of time is consumed dissolving the copper because the copper dissolution reaction is diffusion controlled. The excessive amount of time also gives the copper ions a chance to catalytically decompose the oxidant, thus wasting the oxidant. On the other hand, if the oxidant concentration is too high, a runaway reaction can occur.

Runaway reactions can occur because oxidants decompose more rapidly at elevated temperatures and because the decomposition of most oxidants is exothermic. Thus, in the present invention, when copper ions catalytically decompose the oxidant, heat is released which warms the solution and causes more rapid decomposition of the oxidant.

A convenient means for minimizing the possibility of a runaway decomposition reaction of the oxidant is by determining the concentration of copper ions which will cause a runaway reaction in a given oxidant solution and keeping the copper ions below that concentration. This may be determined by conducting a series of laboratory experiments wherein a solution containing a known concentration of copper ions is slowly added to a solution containing a known amount, and concentration, of oxidant. As the copper solution is added, the mixture is constantly agitated and the temperature rise is monitored. A runaway reaction is indicated by a rapid rise in the temperature of the mixture. This data may be used to calculate the approximate metal ion concentration which caused the runaway reaction in an oxidant solution of a known concentration and used in one of the above described methods to minimize the possibility of a runaway reaction.

In contacting the oxidant solution with the copper in the presence of iron, a variety of methods may be used, including (1) at least partially submerging the copper containing material into the oxidant solution; or (2) flowing the oxidant solution into, or through, the copper containing material. The method of choice frequently depends upon the size and configuration of the substrate in which, or on which, the copper containing material is positioned. Relatively small parts (circuit boards, photographic plates, etc.) may be conveniently cleaned using the submersion method, while larger industrial equipment (boilers, heat exchangers, etc.) may be conveniently cleaned using the flow-through method. The oxidant solution is commonly used at ambient temperatures, however, optionally, it may be preheated to increase the cleaning rate.

While in contact with the copper-iron mixture, the oxidant solution ionizes and dissolves at least a portion of the copper in the mixture. The copper ions are kept at a concentration which will not cause a runaway reaction. This can be accomplished by a variety of means including: (1) monitoring of the metal ion concentration in the oxidant solution during the copper dissolution process; (2) controlling the contact time of the oxidant solution with the copper (3) controlling the temperature of the oxidant solution; and (4) controlling the oxidant concentration in the solution. Controlling the oxidant concentration in the solution is the most convenient and most preferable.

Subsequently, the copper ions are intentionally removed from the oxidant solution. They may be removed while the oxidant is still in contact with the equipment being cleaned or they may be removed after the oxidant solution has been moved to a separate location. A variety of copper removal techniques are suitable including, for example, electroplating, and electroless plating. Electroplating is the preferred removal method because it does not introduce contaminants into the oxidant solution. Electroplating processes are well known in the art and are taught in U.S. Pat. Nos. 4,152,229; 3,843,504; 3,761,369; 4,226,685 and 2,748,071.

A suitable electroplating cell for the removal of copper ions from a solution contains an anode and a cathode. For most removal processes, nickel is suitable for both the cathode and the anode, since is not corroded by most alkaline oxidant solutions. Other, less expensive, materials are equally suitable for use as electrodes provided they are at least somewhat chemically stable in the copper-containing solution. Gauze electrodes, or other electrodes which have a high surface area, are preferred because their large surface area allows quicker plating of the copper. To effect removal of the copper, the copper containing solution is contacted with both electrodes and a direct current is passed through the solution between the two electrodes at a voltage sufficient to cause the copper ions in the solution to electroplate onto the cathode of the cell. It is preferable to operate the cell in a range of cathode potentials of from about $-0.5$ volt to about $-1.0$ volt (verses a Ag/AgCl reference electrode). This minimizes the redissolution of copper (from the electrode) back into the solution, which otherwise may occur if the cathode were too anodic. It also minimizes the formation of a non-adherent copper powder on the electrode which otherwise may result from the cathode being too cathodic.

After at least a portion of the copper has been removed from the solution, additional oxidant is added and the solution is reused to dissolve more copper. In determining how much oxidant should be added, the same considerations discussed earlier about oxidant concentrations apply. The solution may be cycled through the above procedures as many times as desired.

Optionally, more than one type of solution may be used in the method of the present invention. A first solution may be formulated to remove one metal, while a second solution may be formulated to remove a second metal. One solution may be an oxidizing solution, while the other may be a reducing solution. For example, an oxidizing solution may be used to remove the copper, and a reducing solution may be used to remove the iron. The different solutions may be contacted with the copper-iron mixture in any sequential combination to most efficiently dissolve the copper and the iron. Preferably, the equipment is rinsed between solutions.

EXAMPLE

A model steam generator was constructed using a 12 inch diameter carbon steel shell about 42 inches long. Four U-shaped tubes and 22 open "dummy" tubes were placed inside the shell. The tubes were constructed from Inconel 600 alloy. The purpose of the "dummy" tubes was to create a three-dimensional array representative of a real steam generator.

A copper-iron mixture was physically placed in the bottom of the steam generator. The mixture contained 384 grams of $Fe_3O_4$ and 384 grams copper.

Two, 50 liter solutions were prepared, one to dissolve iron and one to dissolve copper. The iron removal solution was a reducing solution and contained components in the following proportions:

$H_2O$: 545 ml
$NH_4OH$ (26° Baume): 15 ml
$N_2H_2$ (35% aqueous solution): 40 ml
$(NH_4)_2SO_4$: 3.6 g
$Na_4P_2O_7.10H_2O$: 0.12 g
ethylenediaminetetraacetic acid (EDTA): 80 g diethylenetriamineacetic acid (DPTA): 13 g
Citric acid: 37 g The copper removal solution was an oxidant solution and contained components in the following proportion:
$H_2O$: 720 ml
$NH_4OH$ (26° Baume): 280 ml
$NH_4HCO_3$: 40 g
$(NH_4)_2S_2O_8$: 28 g With the steam generator vented to prevent the build up of pressure, the copper oxidant solution at ambient temperature was pumped through the steam generator in a manner to contact the copper-iron deposit. The flow rate was adjusted to about 0.5 gallon per minute. The solution was circulated through the steam generator until a portion of the copper was ionized and dissolved into the solution. The oxidant solution was then pumped into an electroplating cell. The cell had anodes and cathodes composed of nickel screens (20 mesh screens, 0.007 inch Ni wire) supported by a 1/16 inch thick nickel window-frame shaped support. Each electrode was connected to a direct current power supply through a nickel foil electrical lead and a copper wire. The electrodes were held in place with ¼ inch nylon nuts and ¼ inch threaded rods. A polypropylene screen was placed between the anode and the cathode to insure that the electrodes did not physically contact each other. The DC power supply was adjusted to 50 amps. Initially the reference electrode showed a reading of −300 millivolts (mv). At this reading, residual oxidant was being decomposed. The readings slowly decreased to about −500 mv and the copper began to plate onto the cathode. As the copper ions in the solution became depleted, the readings decreased to about −900 mv. The current was then reduced to maintain the electroplating cell at a potential more anodic than about −900 mv to prevent powdering and flaking of the copper from the plates.

After a substantial portion of the copper had been removed from the oxidant solution, the solution was removed from the electroplating cell and prepared for recycling to the model steam generator. The pH of the solution was adjusted to greater than pH 10 by adding ammonium hyroxide dropwise. Then, another 28 grams of ammonium persulfate (oxidant) was added to the solution and the above-described cleaning and electroplating processes were sequentially repeated.

After three of the copper cleaning and elctroplating cycles, the steam boiler was thoroughly rinsed with water and one iron removal cleaning cycle was initiated.

The pH of the iron removal solution was adjusted to pH 4±0.1 using citric acid and $NH_4OH$, as required. The solution was pumped through a heat exchanger where its temperature was increased to about 90°–95° C. and was then cycled and recycled through the steam boiler in a manner to contact the copper-iron mixture. At least a portion of the iron in the sludge was ionized and dissolved into the solution. The solution was then removed from the steam generator. The steam generator was rinsed with the water and the copper removing solution was then used again in the manner described earlier.

At the end of the cleaning cycles, analysis of the copper-iron mixture in the tubes of the steam generator showed that almost 100 percent of the copper had been removed.

What is claimed is:

1. A method for dissolving copper in the presence of iron comprising:
   (a) contacting the copper with an oxidant solution containing a less-than-stoichiometric amount of oxidant necessary to dissolve all the copper;
   (b) dissolving a portion of the copper into the solution;
   (c) monitoring the copper ion concentration in the solution;
   (d) controlling the copper ion concentration in the solution below that required to cause a runaway oxidant decomposition reaction;
   (e) removing at least a portion of the dissolved copper from the solution;
   (f) adding additional oxidant to the solution;
   (g) at least repeating steps (a) and (b).

2. The method of claim 1 wherein the oxidant solution is aqueous.

3. The method of claim 1 wherein the oxidant is selected from the group consisting of alkaline metal persulfates, ferric chloride, ferric citrate, the ferric chelate of ethylenediaminetetraacetic acid, oxygen bubbled through water, water soluble ferric salts, ammonium persulfate and ammonium borate.

4. The method of claim 1 wherein the oxidant solution is an aqueous solution having an oxygen containing gas dissolved therein.

5. The method of claim 2 wherein the oxidant solution also contains a chelating or complexing agent.

6. The method of claim 5 wherein the chelating or complexing agent is selected from the group consisting of alkali metal salts of ethylenediaminetetraacetic acid, diethylenetriaminepentaacetic acid, N-hydroxyethylethylenediaminetetraacetic acid, ammonia, ammonium ions, triethanolamine and citric acid.

7. The method of claim 2 wherein the metallic ions are removed from the oxidant solution by electroplating.

8. The method of claim 2 wherein the metallic ions are removed from oxidant solution using an electroless plating process.

9. The method of claim 2 including repeating steps (a) through (c) using a second solution adapted to remove iron.

10. The method of claim 2 including preheating the oxidant solution.

11. The method of claim 2 including controlling the contact time of the solution with the copper.

12. The method of claim 2 including controlling the temperature of oxidant solution during step (b).

13. The method of claim 2 wherein the oxidant solution additionally contains at least one surfactant.

14. The method of claim 2 wherein the oxidant solution additionally contains a pH control agent.

* * * * *

UNITED STATES PATENT AND TRADEMARK OFFICE
CERTIFICATE OF CORRECTION

PATENT NO. : 4,578,162

DATED : March 25, 1986

INVENTOR(S) : James A. McIntyre, Robert F. Phillips and Max R. Oswald

It is certified that error appears in the above-identified patent and that said Letters Patent is hereby corrected as shown below:

Col. 4, line 40; insert --one-- between "other" and "may".

Col. 5, line 1; change "(DPTA)" to --(DTPA)--.

Col. 5, line 45; change "hyroxide" to --hydroxide--.

Col. 5, line 49; change "elctroplating" to --electroplating--.

Signed and Sealed this

Third Day of February, 1987

Attest:

DONALD J. QUIGG

Attesting Officer

Commissioner of Patents and Trademarks